3,220,983
PROCESS FOR THE ANIONIC MANUFACTURE OF LINEAR POLYAMIDES OF HIGH VISCOSITY FROM β-LACTAMS WITH N-ACYL COMPOUND OF A DICARBOXYLIC ACID DIAMIDE AS ACTIVATOR
Erwin Schmidt and Claus Beermann, Frankfurt am Main, and Karl Börner, Bobingen, near Augsburg, Germany, assignors to Farbwerke Hoechst Aktiengesellschaft vormals Meister Lucius & Brüning, Frankfurt am Main, Germany, a corporation of Germany
No Drawing. Filed Feb. 16, 1962, Ser. No. 173,804
Claims priority, application Germany, Feb. 24, 1961, F 33,274
5 Claims. (Cl. 260—78)

The present invention relates to a process for the manufacture of linear polyamides of high viscosity from β-lactams.

It has already been proposed to polymerize β-lactams, which do not carry substituents at the nitrogen atom, under the catalytic action of alkali metal lactamates to obtain linear polyamides. Still further it has been proposed to accelerate the said polymerization by adding N-acyl-lactams (activators).

It has now been found that linear polyamides having a high relative viscosity can be obtained, from β-lactams which are unsubstituted at the nitrogen atom, by alkaline polymerization when the polymerization is conducted in the presence of N-acyl or N-sulfonyl compounds of dicarboxylic acid diamides which no longer carry hydrogen atoms at both nitrogen atoms and/or in the presence of N-sulfonyl compounds from lactams and disulfonic acids. The said compounds act in the polymerization as bifunctional activators. The result was surprising since in the alkaline polymerization of pyrrolidone in the presence of bifunctional activators such an effect has not been observed. (Cf. German Patent 1,025,140, Examples 4 and 5.)

As bifunctional activators there can be used, for example, oxalyldipyrrolidone, adipinyl - bis - (β - methyl - β-butyrolactam), a compound of the formula

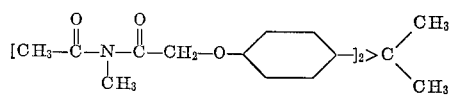

1,3 - benzene - disulfonyl - dipyrrolidone, or the reaction products of lactams or acyl- or sulfonyl-amino compounds carrying at the nitrogen atom a hydrogen atom, with diisocyanates or bischloroformic acid esters of glycols. The bifunctional acyl compound can also be produced in the polymerization batch by adding thereto bifunctional acylating or sulfonating agents, such as the chlorides or anhydrides of dicarboxylic acids or disulfonic acids, and diisocyanates or bischloroformic acid esters of glycols.

The amount of activator required depends on the activity of the bifunctional acyl compound used and on the polymerization reactivity of the β-lactam. It is preferred to use $10^{-6}$ to $2 \times 10^{-3}$ mol of activator for one monomer unit. The polymerization is carried out under mild conditions, the reaction temperature being maintained below 60° C. It is suitable to operate at a temperature in the range of —15° C. to +30° C.

Suitable catalysts are the alkali metal or alkaline earth metal compounds of very weakly acid substances, for example of lactams, carboxylic acid amides or sulfonic acid amides, of acetylacetone or malonic esters or alcohols. Still further there can be used the hydrides or amides of alkali metals and alkaline earth metals, organo-metal compounds such as phenyl-sodium, caustic alkalies or alkali metals.

The amount of catalyst can vary within wide limits without the viscosity of the polymer obtained being essentially modified. It is of advantage to use 0.001 to 0.1 mol and preferably 0.001 to 0.06 mol of catalyst per monomer unit.

The polymerization of the invention is carried out in the presence of solvents. Suitable solvents are those which do not only dissolve the monomer and the activator but also swell the precipitating polymer, for example dimethyl sulfoxide, N - methylpyrrolidone, dimethylformamide, phosphoric acid trisdimethylamide and o-dichlorobenzene.

In order to obtain polymers having an especially high viscosity, it is of advantage substantially to free the monomer and the solvent used from traces of humidity and impurities having a weakly acid nature and acting as chain interrupting agent. The humidity and the impurities are eliminated by distillation with the addition of a solvent which is not miscible with water, by passing through a dry inert gas, or by distillation with the addition of caustic alkali, the alkali metal salts of very weakly acid compounds such as alkali metal lactamates, the alkali metal compounds of acetylacetone or malonic esters, or by adding organo-metal compounds such as Grignard compounds, phenylsodium or alkylaluminum compounds. Still further there can be used the hydrides of alkali metals and alkaline earth metals.

The following examples serve to illustrate the invention but they are not intended to limit it thereto.

Example 1

24 grams of β-methyl-β-butyrolactam were dissolved in 85 cc. of commercial dimethyl sulfoxide and 25 cc. of the solvent were distilled off under reduced pressure. The solution was cooled in a bath to 20° C. With the exclusion of moisture and oxygen, 1 gram of the potassium salt of pyrrolidone and 0.0022 gram of oxalyldipyrrolidone were added. After having been allowed to react for 1 hour at 20° C., the reaction mixture was introduced, with the addition of a small amount of glacial acetic acid, into 200 cc. of acetone, the mixture was stirred with 500 cc. of water, the polymer was filtered off with suction, and dried. 21 grams of polymer were obtained. The product had a relative viscosity of 9.0, determined with a solution of 0.1 gram of polymer in 10 cc. of concentrated sulfuric acid. When 0.0025 gram of acetylpyrrolidone was used under identical conditions instead of oxalyldipyrrolidone as activator, 21 grams of polymer were obtained having a relative viscosity of 7.5.

Example 2

(a) Purification of monomer and solvent: In a vessel with mounted silver jacketed column having a length of 80 cm. a mixture of 2 kilograms of β-methyl-β-butyrolactam and 500 grams of xylene was heated for 4 hours with the exclusion of humidity and oxygen and with reflux under a pressure of 15 mm. of mercury. The purified lactam was then withdrawn at the head. It had a residual moisture content of 0.004%.

5 kilograms of commercial dimethyl sulfoxide were kept for 48 hours over potassium hydroxide, whereby it turned violet. The sulfoxide was filtered and heated for 6 hours in a vessel provided with a 80 cm. long silver jacketed column with reflux under reduced pressure. While maintaining the reduced pressure a current of dried nitrogen was introduced into the liquid through not too thin a capillary tube. The solvent was then distilled off at the head of the column. The dimethyl sulfoxide thus purified had a content of residual humidity of 0.008%. Even after several minutes it did not show any coloration after the addition of the potassium salt of pyrrolidone.

The commercial dimethyl sulfoxide can likewise be purified by adding thereto an excess amount of phenylmagnesium bromide, calculated on the water content, and distilling it.

(b) 300 cc. of β-methyl-β-butyrolactam and 2150 cc. of dimethyl sulfoxide, which had both been purified as described above, were mixed and 720 cc. of the solvent were distilled off under reduced pressure in order to remove residual moisture. In an atmosphere of dry nitrogen 12 grams of the potassium salt of pyrrolidone and 0.027 gram of oxalyldipyrrolidone were added to the remainder. After having been allowed to polymerize for 90 minutes at 20° C., the batch was introduced into 3 liters of acetone containing 10 cc. of glacial acetic acid, the mixture was stirred with 3 liters of water, the polymer was filtered off with suction and dried.

246 grams of polymer were obtained having a relative viscosity of 18.4, determined with a 0.1% solution of the polymer in 10 cc. of concentrated sulfuric acid at 20° C. If the polymerization was carried out under identical conditions with the exception that 0.03 gram acetylpyrrolidone was used instead of oxalyldipyrrolidone, 234 grams of polymer were obtained having a relative viscosity of 11.8.

*Example 3*

The experiment was carried out as described in Example 2, with the use of 0.030 gram of adipinyl-bis-(β-methyl-β-butyrolactam) instead of oxalyl-dipyrrolidone. 240 grams of polymer were obtained having a relative viscosity of 13.5.

*Example 4*

95 grams of β-methyl-β-butyrolactam, 5 grams of β-neopentyl-β-butyrolactam and 700 cc. of dimethyl sulfoxide, which had all been purified as described in Example 2, were mixed and 220 cc. of the solvent were distilled off in order to remove residual amounts of moisture. After the addition of 4 grams of the potassium salt of pyrrolidone and 0.005 gram of oxalyldipyrrolidone the mixture was allowed to polymerize for 150 minutes at 20–25° C., the polymerization mixture was stirred with acetone with the addition of glacial acetic acid, water was added, the polymer was filtered off with suction and dried. 73 grams of polymer were obtained having a relative viscosity of 14.1.

We claim:

1. A process for the manufacture of linear polyamides having a high relative viscosity which comprises polymerizing a β-butyrolactam substituted on the β-carbon atom by an alkyl of one to five carbon atoms under substantially anhydrous conditions at a temperature below 60° C. in a solvent selected from the group consisting of dimethyl sulfoxide, N-methyl pyrrolidone, dimethyl formamide, phosphonic acid-tris-dimethylamide and ortho-dichlorobenzene and in the presence of 0.001 to 0.1 mol per monomer unit of an alkaline catalyst and 0.000001 to 0.002 mol per monomer unit of an N-acyl compound of a dicarboxylic acid diamide as activator.

2. A process for the manufacture of linear polyamides having a high relative viscosity which comprises polymerizing a β-lactam selected from the group consisting of β-methyl-β-butyrolactam, β-neopentyl-β-butyrolactam and mixtures thereof under substantially anhydrous conditions at a temperature below 60° C. in a solvent selected from the group consisting of dimethyl sulfoxide, N-methyl pyrrolidone, dimethyl formamide, phosphonic acid-tris-dimethylamide and ortho-dichlorobenzene and in the presence of 0.0001 to 0.1 mol per monomer unit of an alkaline catalyst and 0.000001 to 0.002 mol per monomer unit of an N-acyl compound of a dicarboxylic acid diamide as activator.

3. A process for the manufacture of linear polyamides having a high relative viscosity which comprises polymerizing a β-butyrolactam substituted on the β-carbon atom by an alkyl of one to five carbon atoms under substantially anhydrous conditions at a temperature below 60° C. in a solvent selected from the group consisting of dimethyl sulfoxide, N-methyl pyrrolidone, dimethyl formamide, phosphonic acid-tris-dimethylamide and ortho-dichlorobenzene and in the presence of 0.001 to 0.1 mol per monomer unit of an alkali-metal lactamate as catalyst and 0.000001 to 0.002 mol per monomer unit of an N-acyl compound of a dicarboxylic acid diamide as activator.

4. A process for the manufacture of linear polyamides having a high relative viscosity which comprises polymerizing a β-butyrolactam substituted on the β-carbon atom by an alkyl of one to five carbon atoms under substantially anhydrous conditions at a temperature below 60° C. in a solvent selected from the group consisting of dimethyl sulfoxide, N-methyl pyrrolidone, dimethyl formamide, phosphonic acid-tris-dimethylamide and ortho-dichlorobenzene and in the presence of 0.001 to 0.1 mol per monomer unit of an alkaline catalyst and 0.000001 to 0.002 mol per monomer unit of a member selected from the group consisting of oxalyl-dipyrrolidone and adipinyl-bis-(β-methyl-β-butyrolactam) as activator.

5. A process for the manufacture of linear polyamides having a high relative viscosity which comprises polymerizing a β-lactam selected from the group consisting of β-methyl-β-butyrolactam, β-neopentyl-β-butyrolactam and mixtures thereof under substantially anhydrous conditions at a temperature below 60° C. in a solvent selected from the group consisting of dimethyl sulfoxide, N-methyl pyrrolidone, dimethyl formamide, phosphonic acid-tris-dimethylamide and ortho-dichlorobenzene and in the presence of 0.001 to 0.06 mol per monomer unit of an alkali-metal lactamate as catalyst and 0.000001 to 0.002 mol per monomer unit of a member selected from the group consisting of oxalyl-dipyrrolidone and adipinyl-bis-(β-methyl-β-buytrolactam) as activator.

References Cited by the Examiner

UNITED STATES PATENTS 2,739,959  3/1956  Ney et al. _____ 260—78
3,037,001  5/1962  Becke et al. _____ 260—78

FOREIGN PATENTS 1,227,632  3/1960  France.

WILLIAM H. SHORT, *Primary Examiner.*

LOUISE P. QUAST, *Examiner.*